W. W. GLEDHILL.
Clothes-Line Support.
No. 213,746. Patented April 1, 1879.
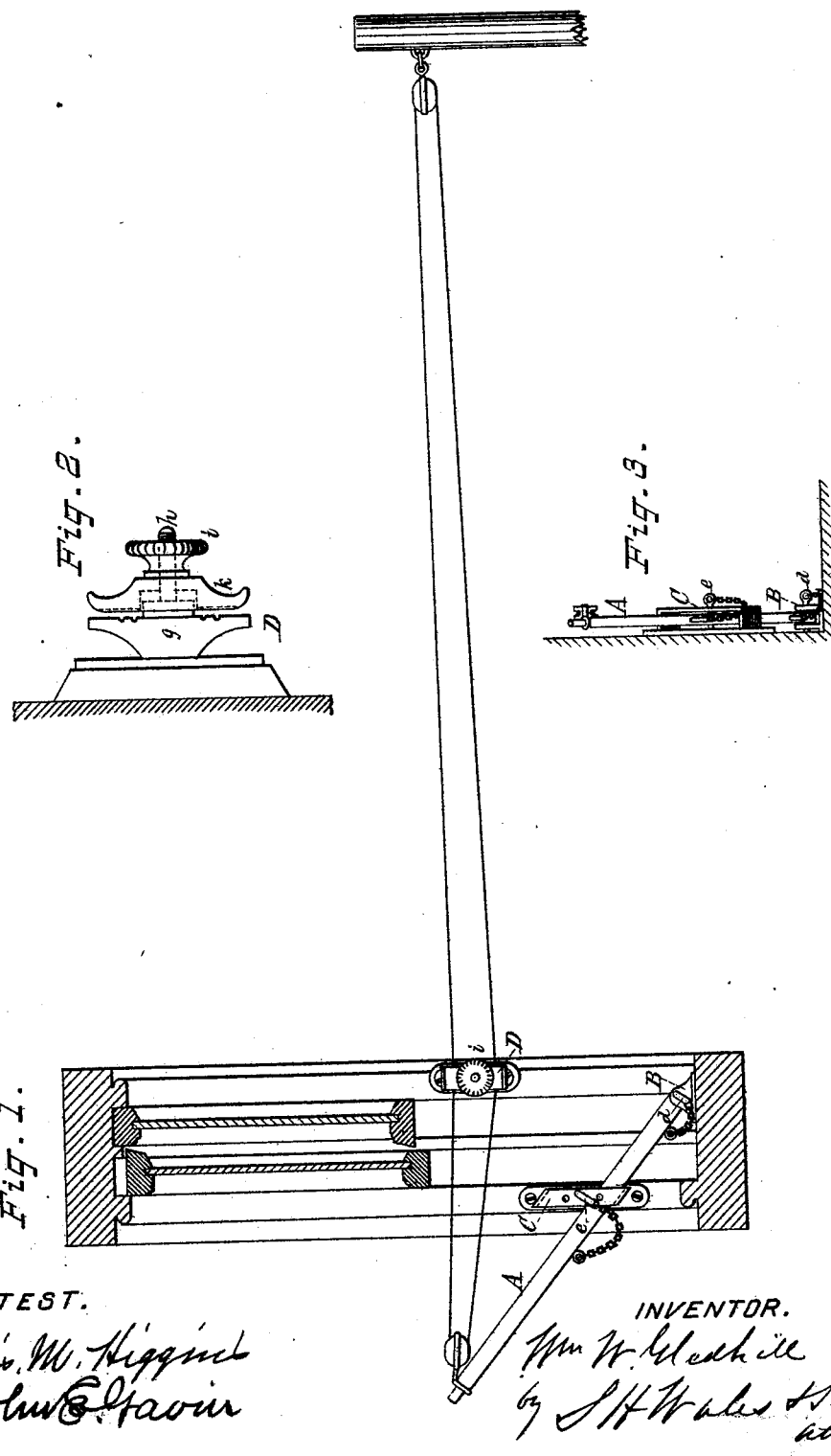

UNITED STATES PATENT OFFICE.

WILLIAM W. GLEDHILL, OF NEW YORK, N. Y.

IMPROVEMENT IN CLOTHES-LINE SUPPORTS.

Specification forming part of Letters Patent No. 213,746, dated April 1, 1879; application filed January 16, 1879.

*To all whom it may concern:*

Be it known that I, WILLIAM W. GLEDHILL, of New York city, have invented certain new and useful Improvements in Clothes-Line Supports, of which the following is a specification:

My invention aims to provide an improved means whereby the actuated end of the pulley-line may be extended within the apartment for convenient operation without the necessity of leaning out of the window, and it has relation to that class of devices in which a supporting-arm or bar removably attached to the interior of the window-frame temporarily supports the accessible end of the line in a convenient operative position within the apartment.

My invention may be said to consist in a supporting-arm of an improved arrangement and mounting, situated on the inner side of the window, and in the combination therewith of a clamping-cleat, situated on the outer side of the window, to hold the line when released from the arm, as hereinafter set forth.

Figure 1 of the drawings is a side elevation of my improved device, shown attached to a window, which is represented in section. Fig. 2 is an elevation of the clamping-cleat removed and viewed at right angles to the line of view of Fig. 1, and Fig. 3 is a similar view of the supporting-arm and its mountings.

In the drawings, A indicates the supporting bar or arm, which is temporarily mounted on the interior of the window and projects within the apartment in an upwardly-inclined position, as shown. The lower and outer end of the arm is pivoted nearly level with the sill in the metal ears or pivot-plate B, which is fixed to the sill in such position as not to interfere with the movements of the lower sash or with the blinds, as shown. The arm is further supported at its middle, or thereabout, in a slotted or elongated clasp, C, fixed on the inner beading of the window-frame, as shown, and in which it is capable of a vertical swing or adjustment, but which prevents its lateral movement. The removable pins *d e*, connected by cords or chains to the arm, hold the arm in proper position in its mountings, the pin *d* forming the pivot of the arm in the ears B, while the pin *e* fits into one or other of a series of holes in the clasp C in advance of the arm, which bears edgewise on the pin, and is thus firmly supported in the desired position against the stress of the line.

The pulley on the inner end of the line is attached to the end of the arm by slipping the loop on the bail of the pulley-block over a projecting pin on the end of the arm, as shown, and it will now be seen that the line is thus extended within the apartment in a position which admits of the clothes being readily put on or taken off and of the line being run in or out without the fatigue or danger of stooping over the line or of leaning out of the window, thus forming a very useful device, as may be observed.

The clamping-cleat D is secured to the outer side of the window-frame in the direction of the line, as shown, which passes between the jaws thereof, so that when the jaws are tightened thereon by the thumb-nut *i* the line is securely held thereby. Hence, when the line is filled with the clothes, or when the line is not in use, the cleat is thus tightened to hold the line from running out. The pulley is then unshipped from the arm and allowed to hang loosely from the cleat, after which the arm may be removed from its mountings, thus allowing the window to be closed, while the line remains securely suspended by the cleat.

When it is necessary to take in the clothes, or to again use the line, the arm is again mounted in position, the pulley-block is slipped thereon, and the cleat released, as will be readily understood, thus permiting the free and convenient operation of the line.

The construction of the cleat is shown best in Fig. 2, the base-plate or fixed jaw *g* being secured to the window-frame and provided with a projecting screw, *h*, which extends through the movable jaw *k* and receives the thumb-nut *i*, by which the jaws are tightened. The stem of the screw is formed square to fit a square recess in the movable jaw, and thus prevent the turning of the latter, while the face of the fixed jaw is formed with horizontal grooves, into which the line becomes embedded, the face of the movable jaw having vertical corrugations to obtain a better hold on the line without tending to cut or injure the same.

The arm A is preferably made of hard wood, while the cleat D and the mountings of the arm are preferably made of cast-iron; and it will be seen that their construction is simple, inexpensive, and secure.

It will also be seen that the mounting of the arm is such that it can be readily removed or attached, as occasion requires, and that the vertical adjustment which its pivoted arrangement, in connection with the elongated clasp, provides thus enables the arm to be set higher or lower to suit the height of the person, or to tighten or loosen the line to allow for the effects of the weather thereon.

It will be further seen that as the pin $e$ does not penetrate the arm, which, on the contrary, bears edgewise on the pin, the full strength of the arm is thus obtained, while the position of the arm is convenient, graceful, and favorable to strength.

What I claim as my invention is—

1. The combination, in a clothes-line support, of a supporting-arm, A, removably attached to the inner side of the window-frame, and adapted to extend the line within the apartment, with the clamping-cleat D, fixed to the outer side of the window-frame to securely hold the line when removed from the arm, substantially as shown and described.

2. The combination, with a clothes-line support, of the supporting-arm A and the pivoting ears B, and elongated adjusting clasp C, provided with suitable fastening-pins $d\ e$, substantially as shown and described.

WILLIAM W. GLEDHILL.

Witnesses:
HENRY GLEDHILL,
WILLIAM BENNETT.